United States Patent
Zander et al.

(10) Patent No.: US 12,497,343 B2
(45) Date of Patent: Dec. 16, 2025

(54) FERTILIZER COMPOSITIONS

(71) Applicant: Glaze Coatings Limited, Hamilton (NZ)

(72) Inventors: Murray Selwin Zander, Hamilton (NZ); Regan James Zander, Hamilton (NZ)

(73) Assignee: Glaze Coatings Limited, Hamilton (NZ)

( * ) Notice: Subject to any disclaimer, the term of this patent is extended or adjusted under 35 U.S.C. 154(b) by 896 days.

(21) Appl. No.: 17/596,897

(22) PCT Filed: Aug. 10, 2020

(86) PCT No.: PCT/NZ2020/050087
§ 371 (c)(1),
(2) Date: Dec. 20, 2021

(87) PCT Pub. No.: WO2021/025565
PCT Pub. Date: Feb. 11, 2021

(65) Prior Publication Data
US 2022/0315505 A1    Oct. 6, 2022

(30) Foreign Application Priority Data

Aug. 8, 2019 (NZ) .................................. 756188
Dec. 24, 2019 (NZ) .................................. 760305

(51) Int. Cl.
*C05G 3/90* (2020.01)
*C05B 7/00* (2006.01)
(Continued)

(52) U.S. Cl.
CPC .................. *C05G 3/90* (2020.02); *C05B 7/00* (2013.01); *C05G 5/27* (2020.02); *C05G 5/38* (2020.02)

(58) Field of Classification Search
CPC ... C05G 3/90; C05G 5/27; C05G 5/38; C05G 5/30
See application file for complete search history.

(56) References Cited

U.S. PATENT DOCUMENTS

| 2,764,499 A | 9/1956 | Porter, Jr. |
| 3,713,919 A * | 1/1973 | Tomic ..................... C06B 47/14 149/43 |
| 3,906,108 A * | 9/1975 | Felty ....................... A61P 17/00 514/969 |

(Continued)

FOREIGN PATENT DOCUMENTS

| CN | 1535939 A | 10/2004 |
| CN | 101200399 A | 6/2008 |

(Continued)

OTHER PUBLICATIONS

"On the Particles Size Distributions of Diatomaceous Earth and Perlite Granulations." Dragan V. Petrovic et al, Journal of Mechanical Engineering 57(2011)11, 843-850, Jun. 2011 (Year: 2011).*

(Continued)

*Primary Examiner* — Amber R Orlando
*Assistant Examiner* — Heather Elise Rainbow
(74) *Attorney, Agent, or Firm* — Knobbe, Martens, Olson & Bear, LLP

(57) ABSTRACT

An aqueous urease inhibitor and/or nitrification inhibitor formulation includes an aqueous wax dispersion, which includes about 10-50% by weight high melting point emulsifying wax, water to make up to 100%, at least one inhibitor active in an amount of 1 wt %-30 wt % of the aqueous wax dispersion, and a dispersing clay in an amount of 5 wt %-50 wt % of the aqueous wax dispersion.

16 Claims, 4 Drawing Sheets

(51) Int. Cl.
*C05G 5/27* (2020.01)
*C05G 5/30* (2020.01)

(56) References Cited

U.S. PATENT DOCUMENTS

| | | | | |
|---|---|---|---|---|
| 4,073,633 | A | * | 2/1978 | Young .................. C05C 9/00 71/64.11 |
| 5,743,949 | A | | 4/1998 | Kainz |
| 2007/0157689 | A1 | * | 7/2007 | Sutton .................. C05C 9/02 71/28 |
| 2010/0206030 | A1 | | 8/2010 | Whitehurst et al. |
| 2015/0299061 | A1 | * | 10/2015 | Catto .................. A01N 45/00 504/284 |
| 2018/0208513 | A1 | | 7/2018 | Kanagalingam et al. |
| 2019/0048260 | A1 | | 2/2019 | Waliwitiya |
| 2019/0055169 | A1 | | 2/2019 | Peters et al. |
| 2019/0200644 | A1 | | 7/2019 | Brant et al. |

FOREIGN PATENT DOCUMENTS

| | | | | |
|---|---|---|---|---|
| CN | 106892785 | A | 6/2017 | |
| CN | 110799475 | B * | 2/2023 | ............... C05B 1/02 |
| EP | 2 456 737 | B1 | 4/2017 | |
| WO | WO-2004083310 | A1 * | 9/2004 | ........... A23L 1/0055 |
| WO | WO-2015034375 | A1 * | 3/2015 | ............. C05C 9/005 |
| WO | WO 2017013573 | A1 | 1/2017 | |
| WO | WO 2018/134765 | A1 | 7/2018 | |
| WO | WO-2018185626 | A1 * | 10/2018 | ............... C05G 3/60 |

OTHER PUBLICATIONS

Machine translation of Sharma, obtained from Espacenet Dec. 2024 (Year: 2024).*
International Search Report in PCT/NZ2020/050087 issued Dec. 1, 2020.

* cited by examiner

FERTILIZER COMPOSITIONS

STATEMENT OF CORRESPONDING APPLICATIONS

This application is based on the specifications filed in relation to New Zealand Patent Application Number 756188 and New Zealand Patent Application 760305, the entire contents of each are incorporated herein by reference.

TECHNICAL FIELD

The present invention relates to improvements in and relating to fertiliser compositions. In particular the present invention relates to improvements in and relating to improvements in relation to fertiliser compositions relating to urease inhibitors and/or nitrification in inhibitors.

BACKGROUND ART

Large scale farming of animals for fibre, leather, meat and dairy production and use of nitrogen based fertilisers in agriculture will significantly increase as the human population grows from 7.7 billion to 9.8 billion by 2050[1].

The aforesaid intensification in agriculture will—unless solutions are found—have a severely negative impact on the environment unless solutions are found to counter nitrogen losses—via nitrous oxide ($NO_2$) greenhouse gas emissions; and ($NO_3$) leaching into waterways via nitrification—from nitrogen based fertilisers and animal urine.

NBPT and DMPP are respectively a urease inhibitor and a nitrification inhibitor both useful in respectively combatting $NO_2$ emissions (volatilisation) and $NO_3$ losses mentioned above.

Finding better ways to utilise inhibitor actives—including NBPT and DMPP (or other urease/nitrification inhibitors including N-(n-propyl) thiophosphoric triamide (NPPT) a urease inhibitor, and 2-(3,4-dimethyl-1H-pyrazol-1-yl) succinic acid (DMPSA) a nitrification inhibitor—in farming practice, to address the above concerns remains a priority.

There is a need to prevent environmental N losses and/or increase N use efficiency.

One problem that currently exists is how to efficiently apply nitrification inhibitors and urease inhibitors to land in need thereof.

Ideally, it would be good if there could be provided an aqueous nitrification inhibitor and/or urease inhibitor formulation which could coat a nitrogen or phosphate containing fertiliser granule.

Indeed, a further problem that needs to be addressed is that presently acidic fertilisers such as phosphate fertilisers degrade NBPT upon coming into contact therewith. This makes co-application of urea with other acidic fertilisers to provide requisite nutrients in a single application step not possible.

It would therefore be ideal if either the coating of a urea granule/chip or the coating of a phosphorous fertiliser granule or chip could enable not only:

enable urea and phosphorous to be mixed without adverse reaction, but also enable NBPT coated urea granules to also be mixed with the phosphate fertiliser granules without degradation of NBPT occurring, due to the low pH of phosphate fertilisers.

It would also be useful if there could be provided an aqueous formulation which can be used for suspending and holding in suspension NBPT rather than organic solvents which are flammable and can react with fertilisers.

Moreover, it would also be useful if the aqueous formulation can be used for also suspending and holding in suspension other urease/nitrification inhibitors including DMPP; NPPT; and DMPSA.

It would also be useful if there could be provided an aqueous formulation which can be used for suspending and holding in suspension urease/nitrification inhibitors which is made from renewable resources which are also non-toxic/biodegradable.

It would also be useful to have ready made pre-mixes of one or more of the main components of the aqueous formulation which are suitable for storage and transportation prior to addition of the inhibitor actives.

There is a need for an aqueous coating composition which includes NBPT in suspension which can be used for coating fertiliser granules including urea.

Alternatively, there is also a need for an aqueous coating composition which includes DMPP; NPPT; or DMPSA; therein, which can be used for coating fertiliser granules.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

Definitions

The term 'inhibitor active(s)' as used herein refers to nitrification inhibitors or urease inhibitors including NBPT; DMPP; NPPT; or DMPSA.

The terms 'granule' and 'chip' as used herein are used interchangeably and refer to a small compact particle of substance. The particle will generally be of a size in the order of substantially between 1 mm-10 mm and most preferably between 2 mm-5 mm. The granule/chip may be naturally occurring or may be fashioned by human manipulation.

The term 'high melting point emulsifying wax' as used herein generally refers:

First, to a high melting point wax which is generally malleable at fairly wide band of room temperatures (i.e. around 5° C.-45° C.) and liquid at substantially at least 50° C. but preferably around 80° C. or above and as with all waxes are insoluble in water but soluble in organic non-polar solvents; and Secondly, the inclusion of an emulsifying agent to the high melting point wax.

SUMMARY OF THE INVENTION

The present invention generally relates to a new aqueous wax dispersion which includes a dispersing clay therein, which can be used to hold NBPT or other urease inhibitors/nitrification inhibitors in suspension for coating onto fertiliser granules.

According to a first aspect of the present invention there is provided an aqueous urease inhibitor and/or nitrification inhibitor coating formulation including:
  i) an aqueous wax dispersion comprising:
    substantially 10-50% by weight high melting point emulsifying wax;
    water to make up to 100%;
  ii) at least one inhibitor active;
    wherein the amount of inhibitor active(s) present is/are substantially: 1 wt %-30 wt % of the aqueous wax dispersion;
  iii) a dispersing clay;
    wherein the amount of dispersing clay is 5 wt %-50 wt % of the aqueous wax dispersion.

According to a second aspect of the present invention there is provided an aqueous urease inhibitor and/or nitrification inhibitor coating formulation substantially as described above wherein the formulation also includes:
  iv) a xanthan or guar gum;
wherein the amount of xanthan or guar gum is 0.25 wt %-1 wt % of the total urease inhibitor and/or nitrification formulation.

According to a third aspect of the present invention there is provided an aqueous urease inhibitor and/or nitrification inhibitor coating formulation substantially as described above wherein the high melting point emulsifying wax is a mineral wax or plant-based wax.

According to a fourth aspect of the present invention there is provided an aqueous urease inhibitor and/or nitrification inhibitor coating formulation substantially as described above wherein the mineral wax is a montan wax.

According to a fifth aspect of the present invention there is provided an aqueous urease inhibitor and/or nitrification inhibitor coating formulation substantially as described above wherein the clay is inert and has a particle size of substantially 20 microns or less.

According to a sixth aspect of the present invention there is provided an aqueous urease inhibitor and/or nitrification inhibitor coating formulation including:
  i) an aqueous wax dispersion comprising:
    10% by weight high melting point emulsifying wax in the order of 70 kg;
    90% water in the order of 630 kg;
  ii) an inhibitor active selected from one of the following: 210 kg NBPT; 210 kg DMPP; 210 kg NPPT; 210 kg DMPSA; or a 210 kg mixture of NBPT and DMPP;
  iii) 100 kg dispersing clay;
  iv) 2.5 kg xanthan gum.

According to a seventh aspect of the present invention there is provided an aqueous urease inhibitor and/or nitrification inhibitor coating formulation
  i) an aqueous wax dispersion comprising:
    30% by weight high melting point emulsifying aqueous wax in the order of 210 kg;
    70% water in the order of 490 kg;
  ii) 200 kg NBPT or 200 kg DMPP;
  iii) 100 kg clay;
  iv) 2.5 kg guar gum.

According to an eighth aspect of the present invention there is provided an aqueous wax dispersion which includes:
  10-50% high melting point emulsified mineral wax or plant-based wax;
  water to make up to 100%.

According to a ninth aspect of the present invention there is provided an aqueous wax dispersion which includes NBPT therein 1 wt %-30 wt % of the aqueous wax substantially as described above.

According to a $10^{th}$ aspect of the present invention there is provided an aqueous wax dispersion which includes an inhibitor active or a combination of a nitrification inhibitor and a urease inhibitor.

According to an $11^{th}$ aspect of the present invention there is provided a wax dispersion substantially as described above wherein the mineral wax is montan wax.

According to a $12^{th}$ aspect of the present invention there is provided a wax dispersion substantially as described above wherein the plant-based wax is selected from:
  carnauba wax;
  rice bran wax.

According to a $13^{th}$ aspect of the present invention there is provided a fertiliser composition which includes a nutrient source in the form of a fertiliser granule or chip, the granule or chip coated with an aqueous urease and/or nitrification inhibitor coating formulation substantially as described above.

According to a $14^{th}$ aspect of the present invention there is provided a fertiliser composition substantially as described above wherein the composition comprises a further outer layer of MgO.

According to a $15^{th}$ aspect of the present invention there is provided a fertiliser composition substantially as described above wherein the amount of MgO added is 2% of the total weight of the fertiliser composition including the MgO.

According to a $16^{th}$ aspect of the present invention there is provided a fertiliser composition substantially as described above wherein the MgO has a particle size of substantially 45 micron or less.

According to an $17^{th}$ aspect of the present invention there is provided a fertiliser composition substantially as described above wherein the fertiliser chip or granule is urea.

According to a $18^{th}$ aspect of the present invention there is provided a fertiliser blend including a quantity of a fertiliser composition substantially as described above wherein together with a quantity of a fertiliser selected from granular or chip forms of:
  Single super phosphate;
  Diammonium phosphate
  Monoammonium phosphate;
  Ammonium polyphosphate;
  Ammonia sulphate;
  Potassium chloride;
  Potassium sulphate;
  Potassium carbonate; or
  Potassium hydrochloride.

According to a $19^{th}$ aspect of the present invention there is provided a method of protecting NBPT and/or DMPP from reacting with an acidic fertiliser granule comprising the steps of:
  a) suspending at least one Inhibitor Active in an aqueous wax dispersion;
  b) coating the resulting suspension from step a) as a first layer onto a fertiliser granule or chip;

c) coating a second layer of MgO onto said first layer.

According to a 20th aspect of the present invention there is provided a method for protecting NBPT coated onto a fertilizer granule from degradation by acidic fertilisers characterized by the step of encapsulating the NBPT layer underneath a further layer of MgO.

According to a 21st aspect of the present invention there is provided a method for protecting NBPT and/or DMPP coated onto a fertilizer granule from degradation by acidic fertilisers characterized by the step of including MgO in the coating formulation which coats the NBPT and/or DMPP (or other urease inhibitor/nitrification inhibitor) onto the fertilizer granule.

According to a 22nd aspect of the present invention there is provided an aqueous coating composition which comprises:
i) an aqueous wax dispersion comprising:
substantially 10-50% by weight high melting point emulsifying wax;
water to make up to 100%;
ii) a dispersing clay;
wherein the amount of dispersing clay is 5 wt %-50 wt % of the aqueous wax dispersion.

According to a 23rd aspect of the present invention there is provided an aqueous coating composition substantially as described above which in addition to the aqueous wax dispersion and dispersing clay includes a guar gum or xanthan gum.

According to a 24th aspect of the present invention there is provided an aqueous wax dispersion which comprises:
high melting point wax being substantially 25% of the aqueous wax dispersion; and
water being substantially 75% of the aqueous wax dispersion.

Preferably, the high melting point wax may be montan wax.

According to a 25th aspect of the present invention there is provided an aqueous wax dispersion substantially as described in the 24th aspect which additionally comprises:
NBPT being 30 wt % of the aqueous wax dispersion;
kaolin clay being 5 wt % of the aqueous wax dispersion.

BRIEF DESCRIPTION OF THE DRAWINGS

Further aspects of the present invention will become apparent from the ensuing description which is given by way of example only and with reference to the accompanying drawings in which.

BEST MODES FOR CARRYING OUT THE INVENTION

Example 1—Method of Manufacture Part 1

Figure 1:
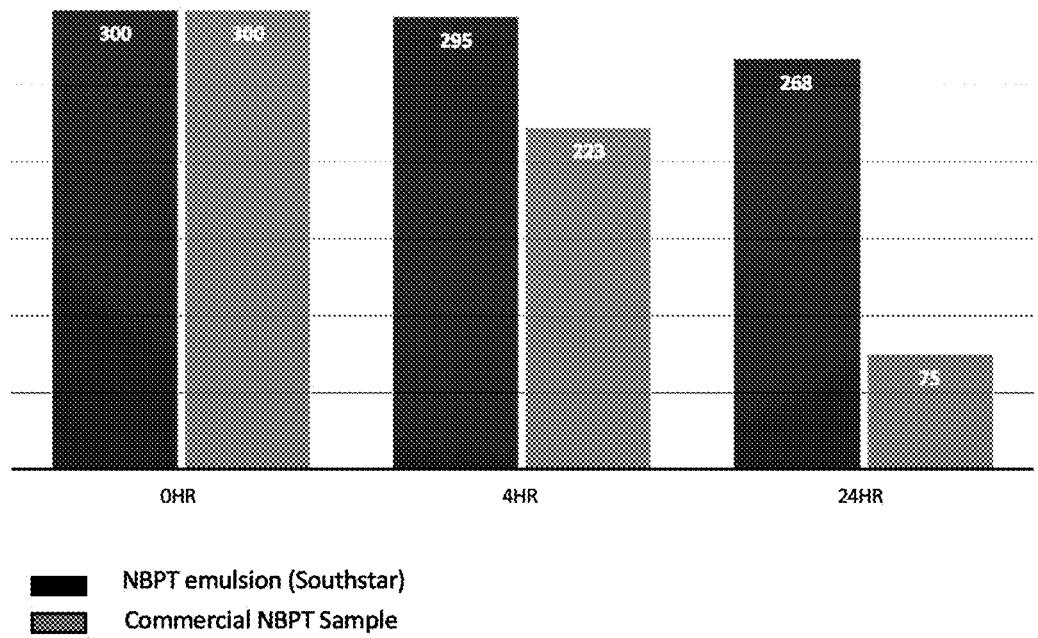
FIG. 1 shows NBPT levels on urea over time comparing the present invention to a current commercially available solvent based NBPT formulation.

The method for manufacturing the aqueous wax dispersion of the present invention comprises the steps of:

Heating water to 95° C.;
Adding powdered high melting point emulsifying wax to the heated water in a 50:50 ratio;
Stirring the wax/water mixture above slowly until homogenous dispersion is achieved;
Adding water to the dissolved wax/water mixture to obtain the desired water to wax ratio whilst slowly stirring;
If required, cooling or allowing the aqueous wax dispersion to cool until it is at room temperature (i.e. 15° C.-20° C.).

The aqueous wax dispersion produced above may be made in advance for later use and/or for shipping/transportation thereof.

The inhibitor additive such as NBPT may be added once the dispersion has cooled to room temperature.

Example 2—Method of Manufacture Part 2

The method for manufacturing an aqueous inhibitor formulation comprises the steps of:
Adding powdered xanthate or powdered guar gum to the dispersing clay and blending together;
Adding the gum/clay pre-mix to the aqueous wax dispersion from Example 1 whilst slowly stirring.

The aqueous wax dispersion produced above may be made in advance for later use and/or for shipping/transportation thereof.

Once the gum/clay/wax dispersion cools to room temperature (around 15° C.-25° C.) you can start to add the inhibitor active(s) thereto.

Example 3

An aqueous urease inhibitor formulation having the following composition:
970 kg Aqueous wax dispersion comprising:
97 kg LICOCARE RBW™ manufactured by Clariant refer
https://www.clariant.com/en/Business-Units/Additives/Waxes/Licocare-RBW
in order of 10 wt % of the aqueous wax dispersion;
873 kg water to make up to 100%;
19.4 kg NBPT in the order of 2 wt % of the aqueous wax dispersion;
48.5 kg kaolin clay in the order of 5 wt % of the aqueous wax dispersion, wherein the particle size of the kaolin clay is 20 micron or less.

Example 4

An aqueous urease inhibitor formulation having the following composition:
700 kg aqueous wax dispersion comprising:
70 kg LICOWAX KST™ manufactured by Clariant refer
https://www.clariant.com/en/Solutions/Products/2014/03/18/16/33/Licowax-KST
being 10 wt % of the aqueous wax dispersion;
630 kg water being 90 wt % of the aqueous wax dispersion;
210 kg NBPT being substantially 30 wt % of the aqueous wax dispersion;
98 kg calcium bentonite clay being substantially 14 wt % of the aqueous wax dispersion;

2.1 kg xanthan gum being substantially 0.3 wt % of the aqueous wax dispersion.

Example 5

An aqueous urease inhibitor formulation having the following composition:
970 kg Aqueous wax dispersion comprising:
- 485 kg LICOWAX KST™ manufactured by Clariant refer
  https://www.clariant.com/en/Solutions/Products/2014/03/18/16/33/Licowax-KST
  being 50% of the aqueous wax dispersion;
- 485 kg water being substantially 50% of the aqueous wax dispersion;
- 291 kg a 50:50 mixture of NBPT and DMPP being substantially 30 wt % of the aqueous wax dispersion;
- 48.5 kg kaolin clay being substantially 5 wt % of the aqueous wax dispersion;
- 0.97 kg guar gum being substantially 1 wt % of the aqueous wax dispersion.

A pink coloured dye can be added as a final step to assist in using the formulation to coat fertiliser granules.

Example 6

An aqueous wax dispersion which has the following composition:
- 250 kg LICOWAX KLE manufactured by Clariant
  https://www.clariant.com/en/Solutions/Products/2014/03/18/16/33/Licowax-KLE-flakes
  being substantially 25% of the aqueous wax dispersion;
- 750 kg water being substantially 75% of the aqueous wax dispersion.

Example 7

This is the aqueous emulsifying wax dispersion of Example 6, but to which has been added:
- 300 kg NBPT being 30 wt % of the aqueous wax dispersion; and
- 50 kg Kaolin clay being 5 wt % of the aqueous wax dispersion.

Example 8

1) Take 1000 kg urea and place in rotating coating drum;
2) Add 100 kg of the 0.3 Aqueous Urea formulation from Example 5, to the urea and start the coating drum;
3) Continue rotating the coating drum until all urea granules are coated with 0.3 aqueous NBPT formulation evidenced once the coated granules have changed colour to pink.

Example 9

Here 980 kg of urea is first coated with 0.3 NBPT aqueous formulation as per Example 8 and as per the additional steps:
4) 20 kg of E45 powdered magnesium oxide is added to the coated urea having a layer of 0.3 NBPT aqueous formulation thereon and the coating drum is started again;
5) When all urea granules are evenly coated with E45 magnesium oxide and are free flow, generally after around 2-3 minutes, the product can be from the coating drum.

Example 10

FIG. 1 shows the comparative results when granular ammonium sulphate is mixed 50:50 with urea coated with:
- a commercially available solvent based NBPT coating; or
- the 0.3 NBPT aqueous wax dispersion of Example 7.

The amount of NBPT was assessed at different time intervals from application to urea using HPLC. As can be seen the aqueous coating of the present invention (Southstar) retained the NBPT on the urea more effectively over a 24 hour period than the commercially available solvent based NBPT coating.

Example 11

Here coated urea as per Example 9 is blended together in equal parts with granular ammonium sulphate (GAS).

Example 12

Here urea is coated with the aqueous wax dispersion of Example 7 substantially following the methodology of example 8.

Figure 2:
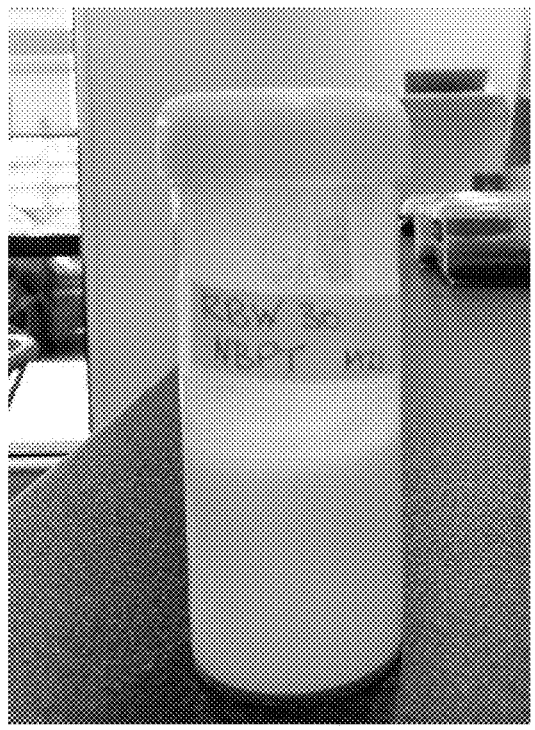
FIG. 2 shows the aqueous emulsifying wax emulsion of the present invention including 30 wt % NBPT both with and without gum.
Figure 2:
Figure 3:
FIG. 3 shows the enclosed chamber used to collect volatilized ammonia from urea fertilizer applied to pasture.

Importantly, as no gum has been added to the wax dispersion the urea needs to be coated within 24 hours of production of the aqueous wax dispersion, before the dispersion separates as shown in FIG. 2.

Example 13

An aqueous urease inhibitor formulation having the following composition:
970 kg aqueous wax dispersion comprising:
- 242.5 kg LICOcare RBW™
  https://www.clariant.com/en/Business-Units/Additives/Waxes/Licocare-RBW
  being 50% of the aqueous wax dispersion;
- 727.5 kg water being substantially 50% of the aqueous wax dispersion;
- 58.2 kg of NBPT being substantially 6 wt % of the aqueous wax dispersion;
- 48.5 kg kaolin clay being substantially 5 wt % of the aqueous wax dispersion;
- 0.97 kg guar gum being substantially 1 wt % of the aqueous wax dispersion.

Example 14

A fertiliser composition comprising:
urea granules; coated with
a layer of an aqueous urease inhibitor in form of 0.3 NBPT on the urea granules. For example as per Example 5 above.

The application process for applying the aqueous NBPT layer to the urea granules being substantially as per Example 8 with appropriate substitution of the 0.3NBPT from Example 5.

Example 15

A fertiliser composition as per Example 14 the composition having a total weight of 1085 kg and wherein the composition undergoes a further coating process to also include a further outer layer of E45 MgO covering the NBPT layer wherein the amount of MgO used to coat the granules of Example 14 is 21.7 kg being 2% of the total weight 1106.7 kg of the NBPT/MgO coated urea granules.

The MgO coating being applied substantially as per the method of Example 9.

Example 16

Here coated urea as per Example 15 is blended together in equal parts with—single super phosphate (SSP).

Example 17

An aqueous urease inhibitor formulation having the following composition:
970 kg Aqueous wax dispersion comprising:
485 kg Carnauba wax in order of 50 wt % of the aqueous wax dispersion;
485 kg water to make up to 100%;
19.4 kg NBPT in the order of 2 wt % of the aqueous wax dispersion;
48.5 kg kaolin clay in the order of 5 wt % of the aqueous wax dispersion.

Example 18

An aqueous urease inhibitor formulation having the following composition:
970 kg Aqueous wax dispersion comprising:
97 kg LICOCARE RBW™
https://www.clariant.com/en/Business-Units/Additives/Waxes/Licocare-RBW
in order of 10 wt % of the aqueous wax dispersion;
873 kg water to make up to 100%;
9.2 kg DMPP in the order of 1 wt % of the aqueous wax dispersion;
485 kg kaolin clay in the order of 50 wt % of the aqueous wax dispersion, wherein the particle size of the kaolin clay is 20 micron or less.

Example 19

An aqueous urease inhibitor formulation having the following composition:
970 kg Aqueous wax dispersion comprising:
485 kg montan wax in order of 50 wt % of the aqueous wax dispersion;
485 kg water to make up to 100%;
19.4 kg NPPT together NBPT (50:50 ratio) in the order of 2 wt % of the aqueous wax dispersion;
48.5 kg kaolin clay in the order of 5 wt % of the aqueous wax dispersion.

Example 20

This example relates to an independent study on the present invention which was undertaken by Lincoln University.

The objective of this study was to determine ammonia volatilisation losses from urea fertiliser containing different urease inhibitor formulations on soil with typical pasture plant coverage.

Experimental Design and Conditions

A standard gas capture system used in this study was similar to that used in the previous studies on ammonia volatilisation conducted at Lincoln University. Briefly, soil monoliths (20 cm diameter×6 cm deep) were taken from a pasture paddock at the Lincoln University Research Dairy Farm. The intact monoliths contained a representative dairy pasture soil (Templeton Sandy Loam) with typical pasture coverage (perennial ryegrass/white clover). The monoliths were moved to the outdoor research facilities at Lincoln University where they were placed in the area adjacent to the ammonia measurement facilities. Stainless steel rings (20 cm diameter×15 cm deep) were inserted 7.5 cm into the ground to enclose each separate monolith. The area outside the enclosures was also pasture to simulate standard field conditions. A clear Perspex lid was attached on top of each enclosure. Each enclosure had inlet and outlet holes allowing the air to be drawn through the chamber (FIG. 1). The outlets were connected through PVC tubing to the acid gas trap system to collect ammonia. The system was calibrated and tested prior to the beginning of the experiment.

Prior to treatment application, soil moisture inside the enclosures was adjusted to field capacity with water. Five treatments were applied in a completely randomised design with four chambers assigned to each treatment (Table 1). Prior to application, fertiliser granules were sieved to the same diameter (1-2 mm) to prevent potential bias due to surface area differences resulting from granule size.

All fertiliser treatments were applied by broadcasting at the rate of 50 kg-N ha-1.

| Treatments | Application rate | Replicates |
| --- | --- | --- |
| 1) Standard Urea | 50 kg N/ha | 4 |
| 2) Urea + NBPT coat + 2% Mg | 50 kg N/ha | 4 |
| 3) Urea + NBPT coat | 50 kg N/ha | 4 |

Ammonia gas from each chamber was collected continuously with 10% of the total flow directed through a manifold to the gas traps, where it was trapped in 0.05 M sulphuric acid.

Samples were collected daily between 3:00 pm and 5:00 am after which fresh volumes of 0.05 M sulphuric acid were placed in the acid traps. Collected samples were then taken to the Lincoln University analytical laboratory and analysed for ammonium concentration using the flow injection analysis method. Daily air and soil temperature were recorded during the experiment.

Results

Immediately after the application to the pasture, a strong ammonia efflux was observed from the standard urea fertiliser, reaching 4.4 kg NH3-N ha-1. Strong volatilisation losses continued for approximately 4 days, after which the daily emissions decreased to below 1 kg NH3-N ha-1 day-1.

In contrast, the application of the two formulations of urease inhibitor fertiliser had no initial peak comparable to that from the standard urea, and emissions occurred at relatively steady rates that mostly did not exceed 1 kg NH3-N ha-1 day-1.

Figure 4:
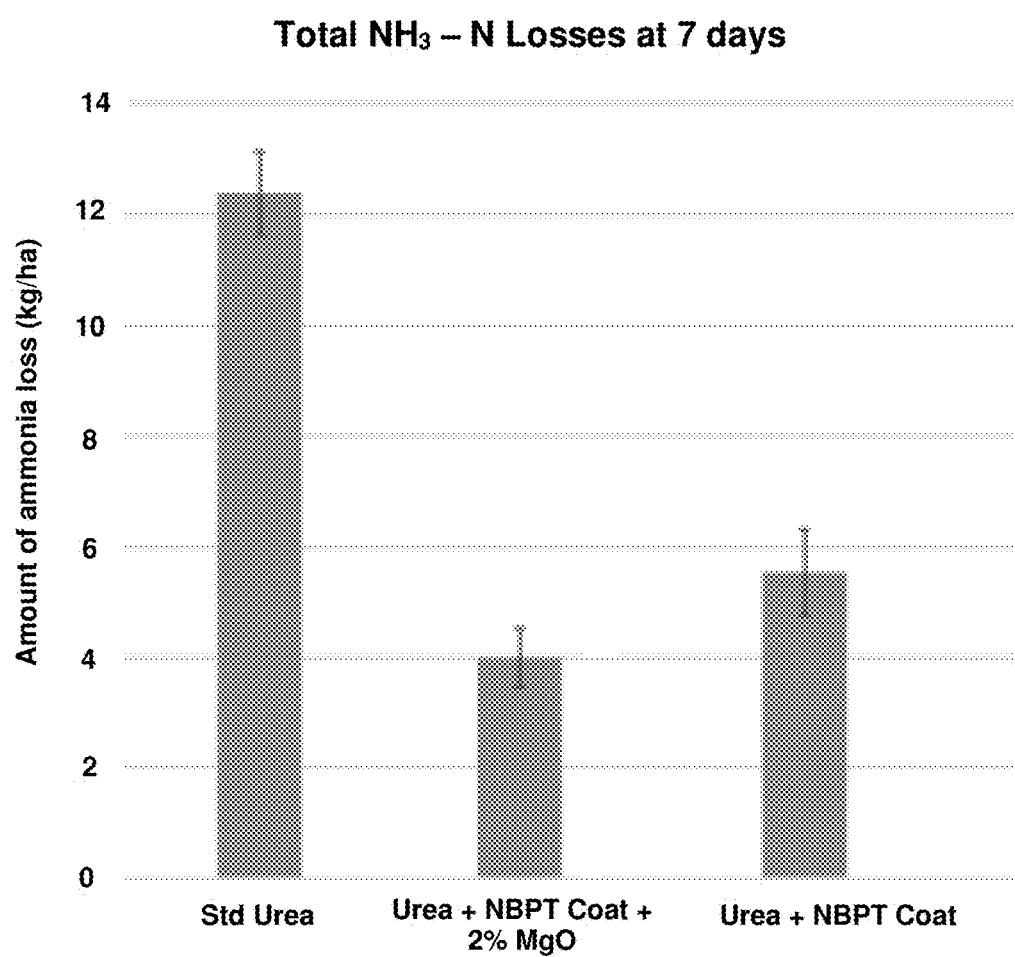
FIG. 4 shows total ammonia volatilisation losses from the fertilisers studied over the first 7 days. Error bars indicate standard errors of the mean.

Initial strong ammonia emissions from the standard urea resulted in significant cumulative losses during the first week after application as shown in FIG. 4. Specifically, 24.8% of the fertiliser N was lost from the standard urea treatment in the first week. The losses were smaller after the first week, which can be attributed to the partial immobilisation and conversion of volatile ammonia into non-volatile forms. The total N losses as ammonia from the urease inhibitor treated fertilisers were significantly lower over the first 7 days, for the urea+NBPT coat+2% Mg and urea+NBPT coat. These are equivalent to 68% and 55% reductions in ammonia losses in the urease inhibitor products compared with the standard urea.

The one week after application data is the most important indicator of the value of the urease inhibitor fertilisers compared to standard urea, since it is likely that rainfall would occur within or after a week in most parts of New Zealand. The likelihood of rainfall within 7 days is shown in Table 2.

Whilst the present invention makes use of waxes it should be appreciated that resins or hydrogenated oils with properties similar to the high melting points waxes used in the present invention may also be employed.

TABLE 2

| Location | Average number of days per month where rain occurred in New Zealand locations* | | | | | | | | | | | | |
|---|---|---|---|---|---|---|---|---|---|---|---|---|---|
| | Jan | Feb | Mar | Apr | May | Jun | Jul | Aug | Sep | Oct | Nov | Dec | Year |
| Hamilton | 7.8 | 6.2 | 7.7 | 8.4 | 11.0 | 12.6 | 12.8 | 13.3 | 11.7 | 11.7 | 10.7 | 10.5 | 124.8 |
| Christchurch | 5.8 | 5.6 | 6.2 | 6.7 | 7.6 | 8.9 | 8.2 | 8.2 | 6.1 | 6.9 | 6.5 | 7.3 | 83.9 |
| Taupo | 7.7 | 6.7 | 7.3 | 7.4 | 8.7 | 10.9 | 10.9 | 11.4 | 10.7 | 10.6 | 8.2 | 9.2 | 108.5 |
| New Plymouth | 8.9 | 7.7 | 9.8 | 9.8 | 12.3 | 13.6 | 12.6 | 13.4 | 12.6 | 14.1 | 10.5 | 9.5 | 135.5 |
| Napier | 6.0 | 5.9 | 7.2 | 7.1 | 7.9 | 8.8 | 9.4 | 8.2 | 7.4 | 7.5 | 6.0 | 6.5 | 88.1 |
| Whangarei | 7.9 | 7.9 | 9.3 | 9.8 | 12.5 | 13.9 | 14.8 | 14.8 | 12.6 | 10.5 | 9.4 | 8.7 | 131.6 |
| Palmerston North | 7.1 | 6.9 | 7.7 | 8.2 | 9.9 | 12.2 | 11.6 | 13.0 | 11.9 | 11.8 | 10.3 | 11.1 | 120.7 |
| Timaru | 6.8 | 6.7 | 6.2 | 5.7 | 5.7 | 5.3 | 5.8 | 5.7 | 5.8 | 7.1 | 6.8 | 8.0 | 75.6 |
| Invercargill | 13.0 | 10.3 | 12.3 | 12.3 | 15.3 | 15.6 | 14.2 | 12.8 | 13.1 | 13.8 | 13.3 | 14.3 | 161.0 |

*Data are mean monthly values for the period 1981-2010.

(Source: niwa.co.nz/sites/default/files/mean_monthly wet-days.xlxs).

After 7 days, the ammonia losses became similar for the different N fertilisers applied.

CONCLUSION

This experiment demonstrated that the urease inhibitor (NBPT) fertiliser formulations applied at a rate of 50 kg-N/ha significantly reduced ammonia volatilisation losses compared to the standard urea applied at the same rate. The efficacy of the four different formulations was similar. The benefits of the urease inhibitors were most evident during the first week after the application, where the NBPT reduced the rate of urea hydrolysis and prevented the strong ammonia efflux typical for the standard urea.

Further Discussion of the Invention Including Non-Limiting Alternate Ways to Implement the Invention The high melting point wax may generally be a mineral wax or plant-based wax.

The importance of a high melting point wax may be stated as the need to ensure the wax does not melt when exposed to direct sunlight and maintains integrity for free flow of chips/granules coated using the present invention. If these characteristics are not important to a given application of the present invention waxes having a melting point of substantially 50° C. may be employed.

In one preferred embodiment the mineral wax may be a Montan wax (also known as Lignite wax).

In other preferred embodiments the high melting point wax may be selected from rice bran wax, or carnauba wax.

In another embodiment the mineral wax may be a paraffin wax.

In some preferred embodiments the high melting point emulsifying waxes may be in powder form and selected from:
  LICOWAX KST™ (made from montan wax);
  LICOCARE RBW™ (made from rice bran wax);
  LICOWAX KLE™ (made from montan wax).
all manufactured and sold by Clariant with further details available from the weblinks noted in the Example sections above.

The inventors have found if wax is present at substantially 60% and water at 40% the resulting viscosity resembles that of treacle and therefore not suitable as a suspension formulation for coating fertilisers.

Numerous emulsifying agents may be suitable for adding to the high melting point wax such as would be apparent to one skilled in the art including anionic and non-ionic emulsifiers or a combination thereof. One suitable emulsifier may be polysorbate 60 and/or PEG 150. Further examples of suitable emulsifiers which can be employed are described in McCutcheons, 2018 Emulsifiers Detergents, North American Edition.

The dispersing clay may be any clay which has a particle size of less than 20 microns and is inert.

In one embodiment the dispersing clay may be kaolin clay.

In one embodiment 90% of the kaolin clay particles may be under 10 microns in size.

In another embodiment the dispersing clay be calcium bentonite may have a particle size of under 20 microns.

The clay and wax play an important role in the formulation as the inventors have surprisingly found they enable NBPT and other inhibitor actives to be stably held in suspension in water. As NBPT normally crystallizes in the presence of water.

The inventors have also found the guar gum or xanthan gum play a key role not only as a thickening agents enabling the viscosity of the formulation to be subtly increased, but also for enabling the NBPT or other inhibitor active to be held in suspension for prolonged periods of 3 to 6 months.

In particular, the guar or xanthan gum holds the clay and NPBT in a homogenous suspension together with the wax. Without the gum, the NBPT and clay separate out from the wax to form a lower emulsion layer and the wax forms a top emulsion layer.

In general, when the formulation of the present invention is to be used as a coating it may also include a coloured dye which can act as a visual indicator that the particles have been coated. The coloured dye may also be useful for showing you have the desired blend.

The invention may also be said broadly to consist in the parts, elements and features referred to or indicated in the specification of the application, individually or collectively, in any or all combinations of two or more of said parts, elements or features.

Aspects of the present invention have been described by way of example only and it should be appreciated that modifications and additions may be made thereto without departing from the scope thereof as defined in the appended claims.

What we claim is:

1. An aqueous urease inhibitor and/or nitrification inhibitor coating formulation comprising:
   i) an aqueous wax dispersion comprising:
      10-50% by weight high melting point emulsifying wax; and
      water to make up to 100%;
   ii) at least one inhibitor active selected from the group consisting of NBPT, DMPP, NPPT and DMPSA; wherein the amount of inhibitor active(s) is/are: 1 wt %-30 wt % of the aqueous wax dispersion at i);
   iii) a dispersing clay, wherein the amount of dispersing clay is 5 wt %-50 wt % of the aqueous wax dispersion at i),
   wherein the inhibitor active and the clay are held in suspension within the aqueous wax dispersion.

2. The aqueous urease inhibitor and/or nitrification inhibitor coating formulation as claimed in claim 1 further comprising:
   a xanthan or guar gum, wherein the amount of xanthan or guar gum is 0.25 wt %-1 wt % of the total aqueous wax dispersion at i).

3. The aqueous urease inhibitor and/or nitrification inhibitor coating formulation as claimed in claim 1, wherein the high melting point emulsifying wax is mineral wax or plant-based wax.

4. The aqueous urease inhibitor and/or nitrification inhibitor coating formulation as claimed in claim 3, wherein the mineral wax is a montan wax.

5. The aqueous urease inhibitor and/or nitrification inhibitor coating formulation as claimed in claim 1, wherein the clay is inert and has a particle size of 20 microns or less.

6. An aqueous urease inhibitor and/or nitrification inhibitor coating formulation comprising:
   i) an aqueous wax dispersion comprising:
      10% by weight high melting point emulsifying wax equivalent of 70 kg; and
      90% water equivalent of 630 kg;
   ii) an inhibitor active selected from the group consisting of: 210 kg NBPT; 210 kg DMPP; 210 kg NPPT; 210 kg DMPSA; and a 210 kg 50:50 mixture NBPT and DMPP;
   iii) 100 kg dispersing clay; and
   iv) 2.5 kg xanthan gum),
   wherein the inhibitor active, the clay and the xanthan gum are held in suspension within the aqueous wax dispersion.

7. An aqueous urease inhibitor and/or nitrification inhibitor coating formulation comprising:
   i) an aqueous wax dispersion comprising:
      30% by weight high melting point emulsifying wax equivalent of 210 kg;
      70% water equivalent of 490 kg;
   ii) 200 kg NBPT or 200 kg DMPP;
   iii) 100 kg dispersing clay; and
   iv) 2.5 kg guar gum,
   wherein the NBPT or DMPP, the clay and the guar gum are held in suspension within the aqueous wax dispersion.

8. An aqueous wax dispersion comprising:
   10-50% by weight high melting point emulsifying wax;
   water to make up to 100%; and
      NBPT in an amount of 1 wt %-30 wt % of the emulsifying wax and water),
   wherein the NBPT is held in suspension within the aqueous wax dispersion.

9. The aqueous wax dispersion as claimed in claim 8, wherein the emulsifying wax is a plant-based wax selected from the group consisting of:
   carnauba wax; and
   rice bran wax.

10. A fertilizer composition which includes a nutrient source in the form of a fertilizer granule or chip, the granule or chip coated with an aqueous urease and/or nitrification inhibitor coating formulation as claimed in claim 1.

11. The fertilizer composition as claimed in claim 10 wherein the composition comprises a further outer layer of MgO.

12. The fertilizer composition as claimed in claim 11 wherein the amount of MgO added is 2% of the total weight of the fertilizer composition including the MgO.

13. The fertilizer composition as claimed in claim 11 wherein the MgO has a particle size of 45 micron or less.

14. The fertilizer composition as claimed in claim 10, wherein the fertilizer chip or granule is urea.

15. A fertilizer blend including a quantity of the fertilizer composition as claimed in claim 13 together with a quantity of a fertilizer selected from granular or chip forms of:
   Single super phosphate;
   Diammonium phosphate
   Monoammonium phosphate;
   Ammonium polyphosphate;
   Ammonia sulphate;
   Potassium chloride;
   Potassium sulphate;
   Potassium carbonate; or
   Potassium hydrochloride.

16. A method of protecting NBPT and/or DMPP from reacting with an acidic fertilizer granule comprising the steps of:
   a) coating an aqueous urease inhibitor and/or nitrification inhibitor coating formulation as claimed in claim 1 as a first layer onto a fertilizer or mineral granule or chip;
   b) coating a second layer of MgO onto said first layer.

* * * * *